United States Patent [19]

Picheny

[11] Patent Number: 4,817,158
[45] Date of Patent: Mar. 28, 1989

[54] NORMALIZATION OF SPEECH SIGNALS

[75] Inventor: Michael A. Picheny, White Plains, N.Y.

[73] Assignee: International Business Machines Corporation, Armonk, N.Y.

[21] Appl. No.: 662,867

[22] Filed: Oct. 19, 1984

[51] Int. Cl.$^4$ .............................................. G10L 5/00
[52] U.S. Cl. ...................................... 381/47; 381/43
[58] Field of Search ................................... 381/36–43, 381/46–52, 94; 382/18

[56] References Cited

U.S. PATENT DOCUMENTS

| Re. 32,172 | 6/1986 | Johnston et al. | 381/46 |
| 2,938,079 | 5/1960 | Flanagan | 381/50 |
| 4,038,503 | 7/1977 | Moshier | 381/43 |
| 4,060,694 | 11/1977 | Suzuki et al. | 381/45 |
| 4,069,393 | 1/1978 | Martin et al. | 381/43 |
| 4,087,630 | 5/1978 | Browning et al. | 364/513.5 |
| 4,184,049 | 1/1979 | Crochiere et al. | 381/41 |
| 4,286,115 | 8/1981 | Sakoe | 381/43 |
| 4,315,319 | 2/1982 | White | 381/94 |
| 4,388,495 | 6/1983 | Hitchcock | 381/43 |
| 4,426,551 | 1/1984 | Komatsu et al. | 381/41 |
| 4,567,610 | 1/1986 | McConnell | 382/18 |

OTHER PUBLICATIONS

P. S. Cohen et al., "Automatic Amplitude Normalization of Speech", IBM Technical Disclosure Bulletin, vol. 16, No. 8, pp. 2610–2611, New York, U.S.A., Jan. 1974.

S. K. Das, "Amplitude Normalization for Discrete Utterance Recogntion", IBM Technical Disclosure Bulletin, vol. 22, No. 12, pp. 5524–5525, New York, U.S.A., May 1980.

H. F. Silverman et al., "A Parametrically Controlled Spectral Analysis System for Speech", IEEE Transactions on Acoustics, Speech, and Signal Processing, vol. ASSP-22, No. 5, pp. 362–381, Oct. 1974.

Primary Examiner—Emanuel S. Kemeny
Assistant Examiner—David D. Knepper
Attorney, Agent, or Firm—Marc A. Block

[57] ABSTRACT

A method and a system are disclosed for normalizing a speech signal prior to a speech recognition process. In a preparatory procedure, a sample interval of speech is separated into thirty-one frequency bands and an amplitude histogram is generated for each band. From these histograms, the 5% percentile amplitude value P(05) and the 95% percentile amplitude value P(95) are extracted for each band and these values are stored for later reference. For actual normalization, the current speech signal is also divided into the same frequency band as in the preparatory procedure, and consecutive input amplitude values A(in) of each frequency band are modified, using the percentile values of the respective band, to obtain output values according to $$A(\text{out}) = \frac{A(\text{in}) - P(05)}{P(95) - P(05)}.$$

The essential effect of this normalizing treatment is that the resulting long-term spectrum is given by the P(95) values and the spectrum of silence is given by the P(05) values. After normalization, all speech has the same silence spectrum and long-term spectrum.

10 Claims, 7 Drawing Sheets

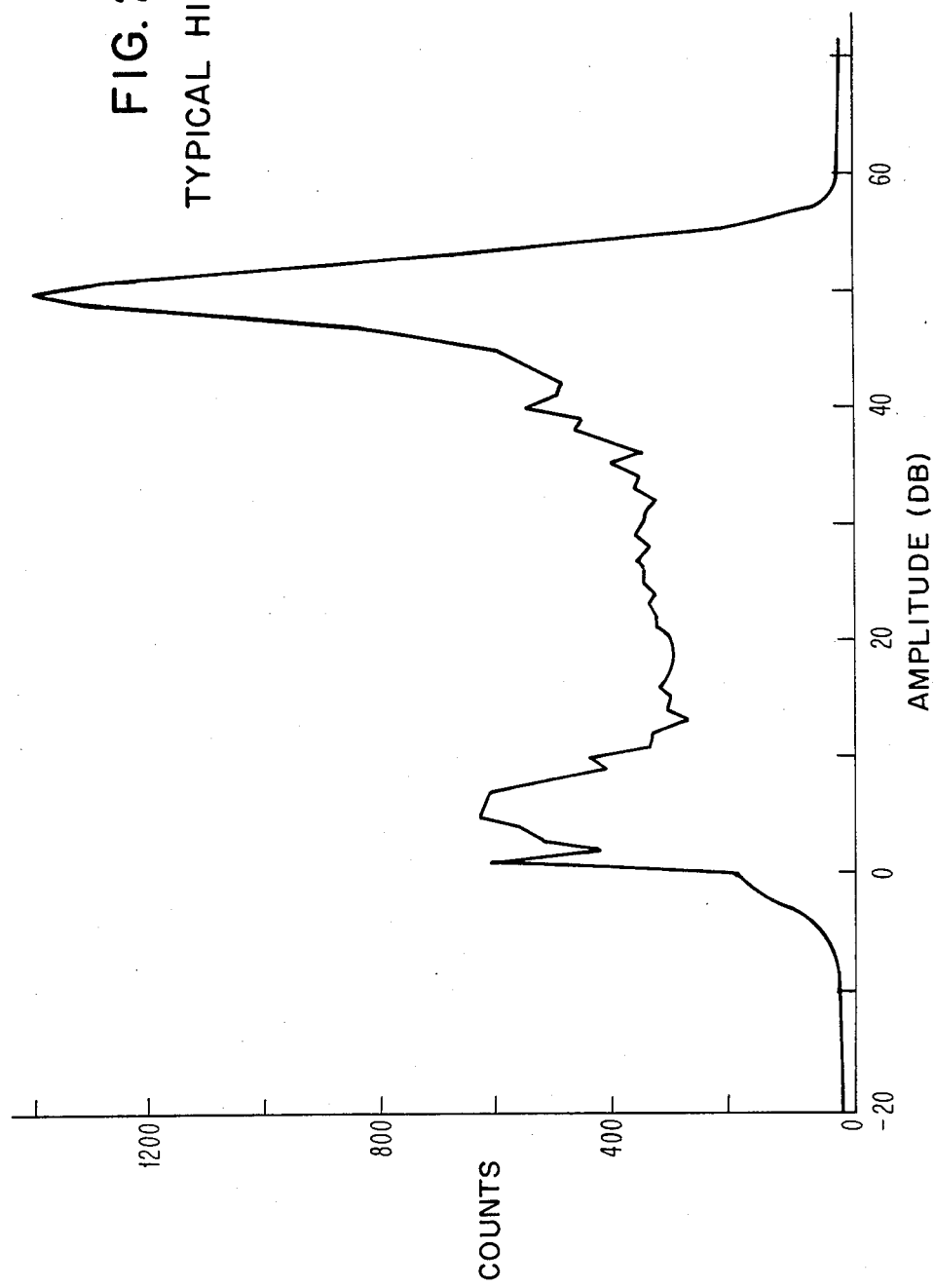

FIG. 2B

TYPICAL HISTOGRAM VALUES

| Amplitude Level (DB) | Count | Amplitude Level (DB) | Count |
|---|---|---|---|
| -20 | 3 | 25 | 344 |
| -19 | 1 | 26 | 354 |
| -18 | 2 | 27 | 333 |
| -17 | 1 | 28 | 359 |
| -16 | 0 | 29 | 347 |
| -15 | 3 | 30 | 342 |
| -14 | 3 | 31 | 323 |
| -13 | 1 | 32 | 361 |
| -12 | 3 | 33 | 354 |
| -11 | 8 | 34 | 395 |
| -10 | 11 | 35 | 349 |
| -9 | 8 | 36 | 399 |
| -8 | 18 | 37 | 466 |
| -7 | 22 | 38 | 447 |
| -6 | 42 | 39 | 546 |
| -5 | 58 | 40 | 489 |
| -4 | 87 | 41 | 482 |
| -3 | 137 | 42 | 526 |
| -2 | 166 | 43 | 559 |
| -1 | 188 | 44 | 591 |
| 0 | 608 | 45 | 712 |
| 1 | 423 | 46 | 816 |
| 2 | 515 | 47 | 1028 |
| 3 | 547 | 48 | 1298 |
| 4 | 626 | 49 | 1396 |
| 5 | 620 | 50 | 1260 |
| 6 | 611 | 51 | 1022 |
| 7 | 524 | 52 | 711 |
| 8 | 408 | 53 | 486 |
| 9 | 434 | 54 | 243 |
| 10 | 335 | 55 | 132 |
| 11 | 333 | 56 | 48 |
| 12 | 267 | 57 | 21 |
| 13 | 307 | 58 | 8 |
| 14 | 301 | 59 | 1 |
| 15 | 320 | 60 | 0 |
| 16 | 302 | 61 | 1 |
| 17 | 295 | 62 | 1 |
| 18 | 295 | 63 | 0 |
| 19 | 297 | 64 | 0 |
| 20 | 323 | 65 | 0 |
| 21 | 323 | 66 | 0 |
| 22 | 334 | 67 | 0 |
| 23 | 323 | 68 | 0 |
| 24 | 344 | 69 | 0 |
|   |   | 70 | 0 |

FIG. 4 HISTOGRAM GENERATION FOR CHANNEL i
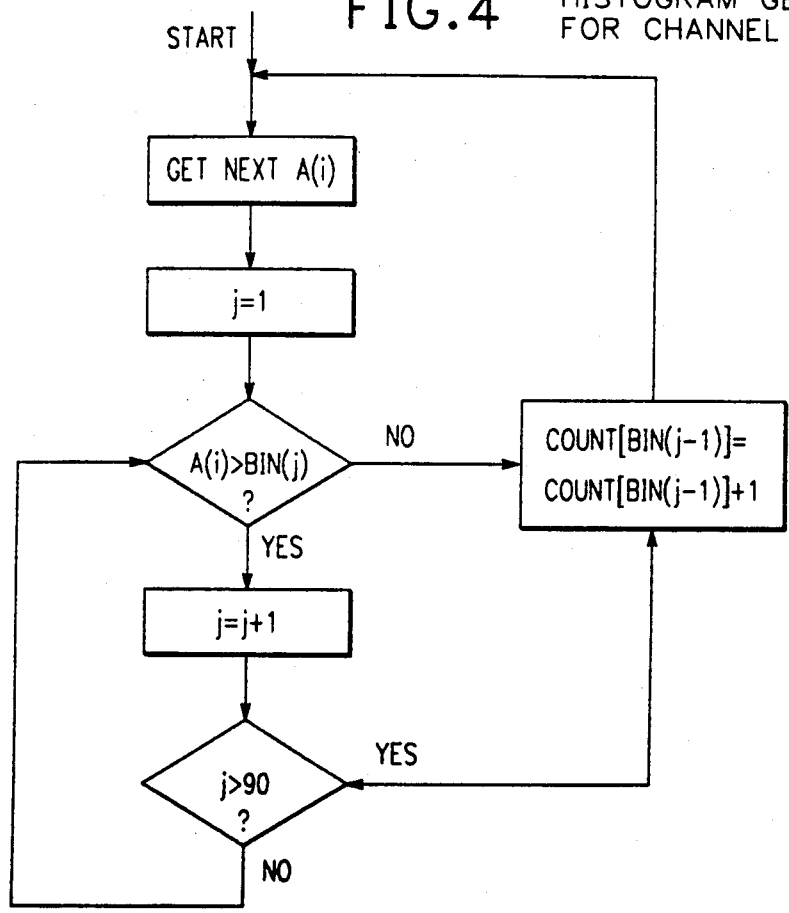
A( i ) = AMPLITUDE FOR CURRENT TIME INTERVAL IN CHANNEL i
BIN ( j ) = LOWER BOUNDARY AMPLITUDE FOR LEVEL j
COUNT [BIN( j )] = CUMULATIVE COUNT FOR LEVEL j
$$j = 1 \cdots k \qquad k = 90$$

PERCENTILE EXTRACTION

TC = TOTAL HISTOGRAM AMPLITUDE COUNT OF CHANNEL i

L5 = 5TH PERCENTILE COUNT

L95 = 95TH PERCENTILE COUNT

P(05) = 5TH PERCENTILE AMPLITUDE VALUE

P(95) = 95TH PERCENTILE AMPLITUDE VALUE

ACC = ACCUMULATIVE HISTOGRAM AMPLITUDE COUNT OF ALL LEVELS UP TO j

BIN(j) = CF. FIG. 4

NORMALIZATION OF SPEECH SIGNALS

FIELD OF INVENTION

The present invention is related to the normalization of speech signals for speech recognition, and in particular to a method and a system for normalizing speech signals which avoid distortion in the spectrum of silence of the normalized speech.

BACKGROUND OF INVENTION

In speech recognition systems it is important that the speech signals are normalized to enable successful comparison of the unknown spoken information with stored patterns or models. Thus, the variations in amplitude or energy that occur between different utterances of the same word or sentence by different speakers, or even by the same speaker at different times, must be eliminated or at least reduced.

A common source of variation, both between speakers and for a single speaker over time, is due to changes in the glottal waveform of vowels, and the energy in high-frequency fricatives. To normalize this variation, appropriate filtering may be employed.

In an article by H. F. Silverman et al. entitled "A Parametrically Controlled Spectral Analysis System for Speech", IEEE Transactions on Acoustics, Speech and Signal Processing, Vol. ASSP-22, No. 5, October 1974, pp. 362-381, amplitude calibration or normalization is described. For normalizing above-mentioned variations, the article suggests filtering the input speech with a linear filter matched to the long-term speech spectrum. The problem with this solution is that such a filter will distort the spectrum of silence, while normalizing the vowel and fricative spectra. Though the handling of silence in speech signal processing is also briefly addressed, no solution for overcoming distortion in the spectrum of silence that will occur during normalization is disclosed.

U.S. Pat. No. 4,060,694 to Suzuki et al. entitled "Speech Recognition Method and Apparatus Adapted to a Plurality of Different Speakers" also deals with the normalization of the sound pressure level of an input speech signal. However, the problems caused by the existence of intervals of silence in the speech signals are not addressed.

DISCLOSURE OF THE INVENTION

It is therefore a general object of the invention to devise a method of speech signal normalization for eliminating or reducing variations prior to a speech recognition process.

It is a particular object of the invention to devise such a normalization method which avoids a distortion of the speech signal spectrum due to intervals of silence.

A further object of the invention is a speech signal normalization method that avoids distortion in the spectrum of silence and which achieves the normalization in a relatively simple but rather effective way.

These objects and other advantages are achieved by a speech normalization method in which initially amplitude histograms are generated for different frequencies, in which a pair of particular percentile values is then obtained from these histograms for each of the frequencies, and in which finally during the actual normalization the amplitude values of the input speech signal are adapted using the pair of percentile values for each frequency.

The advantage of this method is that an overall normalization is obtained with relatively few extra processing steps in addition to those otherwise necessary in a speech recognition system, and that recognition results in such a system are substantially improved.

The invention and its operation will become more apparent from the following description of a preferred embodiment and from the accompanying drawings.

BRIEF DESCRIPTION OF THE DRAWINGS

FIG. 2A and 2B show a sample histogram obtained in an arrangement according to FIG. 1, and the respective list of count values per amplitude level;

FIG. 4 is a flow diagram of the histogram generation procedure;

DETAILED DESCRIPTION

(A) Principle of Percentile Normalization

For normalizing a speech signal prior to processing it in a speech recognition procedure, it is handled as follows for avoiding distortion of the spectrum of silence which would occur if the speech signal were only filtered to match the long-term speech spectrum:

First, amplitude histograms as a function of frequency are collected for the respective speech signal of a single speaker. Then, for each frequency, the amplitudes defining the 5th percentile, P(05), and the 95th percentile, P(95) are extracted from the histograms. For new speech, the amplitude at a given frequency is normalized according to $$A(out) = \frac{A(in) - P(05)}{P(95) - P(05)}$$

The essential effect of this normalizing treatment is that the long-term spectrum of the resulting speech signal is given by the P(95) amplitude values, and the spectrum of silence is given by the P(05) amplitude values. After normalization, all speech has the same silence spectrum and long-term spectrum.

(B) Basic Description of Embodiment

Figure 1:
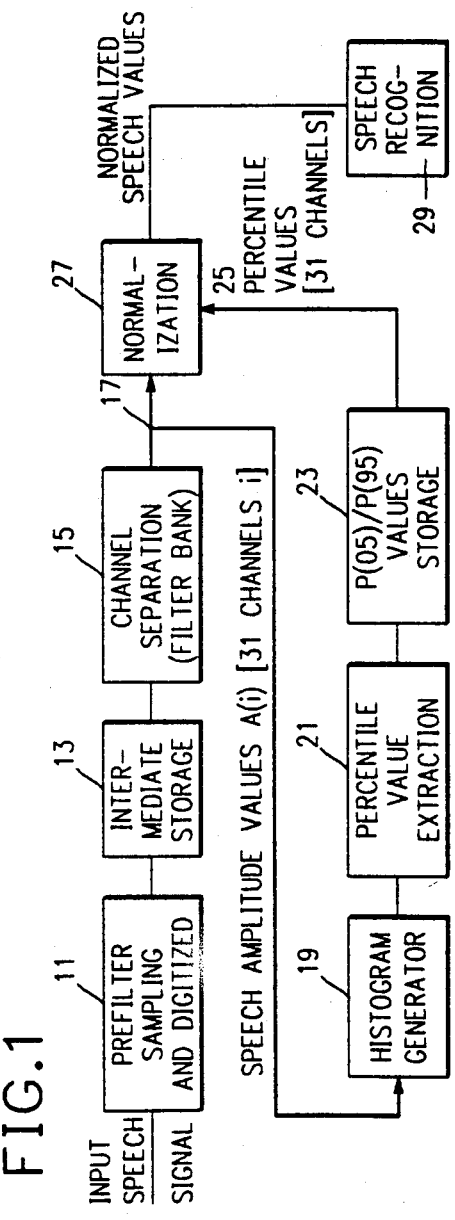
FIG. 1 is a block diagram of an arrangement for the speech normalization procedure according to the invention, including percentile amplitude value generation and actual normalization.

FIG. 1 shows a block diagram of an arrangement by which a speech signal can be normalized according to the invention. There is a common portion used for both initial preparation and actual normalization, a second portion which is only used for initial generation of percentile amplitude values, and another portion of the actual normalization.

(1) Common Portion for Obtaining a Band Separated Speech Signal

This portion consists of sections 11, 13 and 15. In section 11, the available speech signal is prefiltered, sampled and digitized in the usual manner. The obtained digital values are intermediately stored in section 13 from where they can be extracted in blocks. Section 15 represents a filter bank for separating the speech signal (available in sampled and digital form) into 31 channels or frequency bands. In the present embodiment, there are eight bands of equal bandwidth for the range from 200 Hz to 1,000 Hz, and 23 further bands on a logarithmic scale for the range above 1 kHz. Another number of bands with another bandwidth distribution can of course be used if appropriate.

The speech signal is then available on connection 17 in 31 separate channels. Though the separation of a digitized signal into subbands is a standard procedure, a few more details of the filter bank 15 will be described in chaper (C) with reference to FIG. 4.

(2) Portion for Generating Percentile Amplitude Values

Prior to the actual normalization, percentile values must be obtained by analyzing a sample interval of the speech that is to be recognized. For this purpose, sections 19 through 23 are provided.

In section 19, histograms are generated from a 1-minute interval of the band-separated speech signal. One histogram is prepared for each frequency band. It shows how the amplitude values observed for the respective band are distributed over a plurality of levels or discrete amplitude ranges. For the present embodiment, the total amplitude range is separated into ninety 1-dB intervals which range from $-20$ dB to 70 dB.

FIG. 2A shows a typical histogram, and FIG. 2B is a listing of the amplitude counts of this histogram (both for a single one of the 31 bands). One can see that during the 1-minute evaluation interval, e.g. 620 samples had an amplitude of ca. 5 dB, 1260 samples had an amplitude of ca. 50 dB, and so forth. A few more details of the generation of these histograms will be given in chapter (C) below with reference to FIGS. 5A and 5B.

In section 21, the percentile amplitude values P(05) and P(95) for each band are extracted from the histograms. These are the two amplitudes for which only 5% of all counted amplitude values (of that respective band) were smaller or greater, respectively. The obtained 31 pairs of percentile amplitude values are stored in section 23 from whose output connections 25 they will be available for later reference. Some typical percentile amplitude values are as follows:

| Channel 4: | P(05) = −4 dB | P(95) = 55 dB |
|---|---|---|
| Channel 10: | P(05) = −6 dB | P(95) = 47 dB |
| Channel 20: | P(05) = −4 dB | P(95) = 46 dB |

Figure 6:
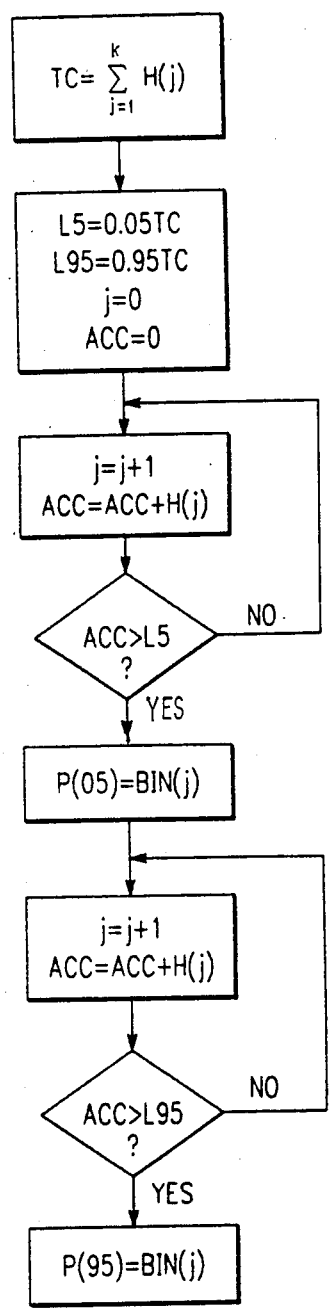
FIG. 6 is a flow diagram of the procedure for extracting percentile amplitude values from the histograms.

A few more detials on the percentile value extraction will also be explained in chapter (C) with reference to FIG. 6.

(3) Current Speech Signal Normalization

Section 27 is the portion for the actual normalization. On its input connections 17 it will receive a continuous stream of speech signal amplitude values A (in), separated according to frequency bands, and on its input connections 25 there are available the previously generated percentile amplitude values for all bands. Section 27 generates the normalized output amplitude values A(out) for each band according to the relation.

$$A(\text{out}) = \frac{A(\text{in}) - P(05)}{P(95) - P(05)}.$$

Figure 7A:
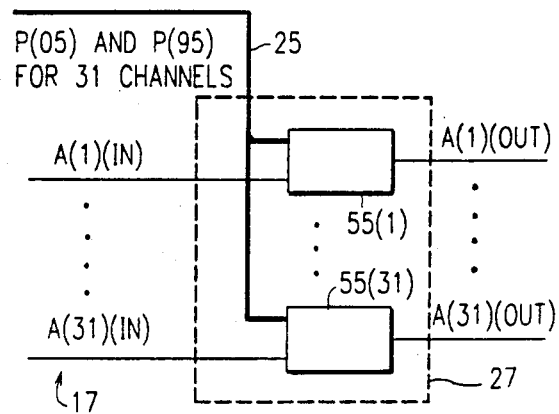
FIG. 7A and 7B show an arithmetic circuit implementation of the section for actual speech signal normalization, using the previously generated percentile amplitude values.
Figure 7B:
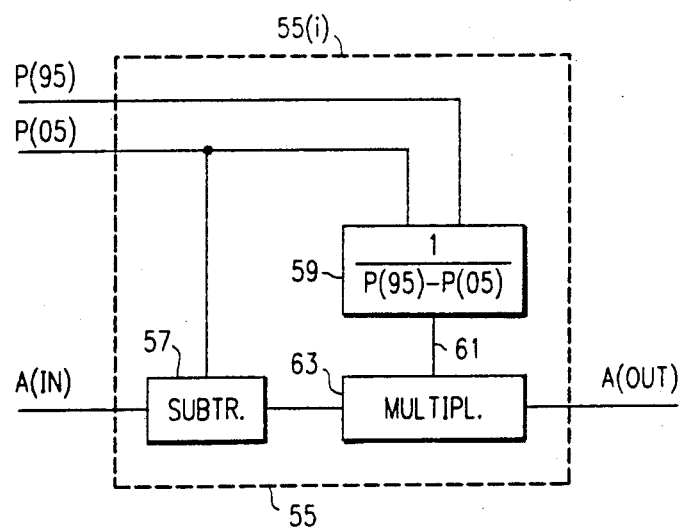

A circuit implementation of section 27 will be briefly described in chapter (C) with reference to FIGS. 7A and 7B.

The normalized amplitude values A(out) could either be directly furnished to a speech recognition unit 29, or they could be intermediately stored for later reference.

(C) Details of Selected Sections

Figure 3:
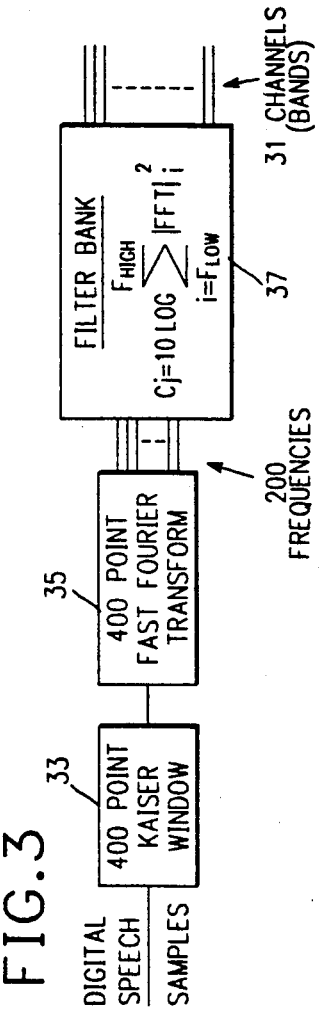
FIG. 3 is a block diagram of the filter bank for separating the speech signal into 31 frequency bands or channels.

In FIG. 3 the filter bank 15 for separating the speech signal into 31 channels is shown in more detail. Unit 33 represents a Kaiser window which is used for shaping the spectrum of the input signal to make it more suitable for subsequent processing. It accepts blocks of 400 speech signal sample values and furnishes, at the ith output, blocks of the same size wherein the values are modified according to the desired window function (the Kaiser window for present embodiment). Windowing operations are described elsewhere, e.g. in the above mentioned article by H. F. Silverman et al. and thus no more details need be given here.

In unit 35, a Fast Fourier Transform is performed on each block of modified speech samples received from the window 33. The output of unit 35 is a block of amplitude values for 200 different frequencies. These values are then transferred to the filter bank unit 37 which generates amplitude values for 31 channels or frequency bands, representing a spectral analysis of the input speech signal. The filter bank function can be represented by $$C_j = 10 \log_{10} \sum_{i=F_{LOW}}^{F_{HIGH}} |FFT|_i^2$$

No more details on units 35 and 37 appear to be necessary because the Fast Fourier Transform is described in chapter 6 of a book by A. V. Oppenheim and R. W. Schafer entitled "Digital Signal Processing", Prentice-Hall, Englewood Cliffs, N.J. 1983, and a description of a typical implementation of a filter bank can be found in an article by D. H. Klatt "A Digital Filter Bank for Spectral Matching", published in the "Conference Record of the 1976 IEEE International Conference on Acoustics, Speech and Signal Processing" on pages 573–576.

The sequential amplitude values A(i) exiting element 15 for each channel i represent the energy amplitude of the respective frequency band for consecutive time intervals of 0.01 sec each. These values are used as input for the histogram and percentile amplitude value generation and for the normalization operation.

(2) Histogram Generation

In the flow diagram of FIG. 4, an implementation of the histogram generation procedure is depicted. For each of the 31 channels, a plurality of k counting bins is provided. Each bin represents one of the k discrete amplitude levels BIN(j) that are provided (90 levels in the present embodiment), and it counts the occurrences of amplitude values A(i) that fall into the respective level which ranges from BIN(j) to BIN(j+1). An incoming value A(i) is compared to consecutive level values BIN(j), starting with the lowest one, until it exceeds the current value BIN(j). Then the count value for the preceding level BIN(j−1) is increased by one unit.

Figure 5A:
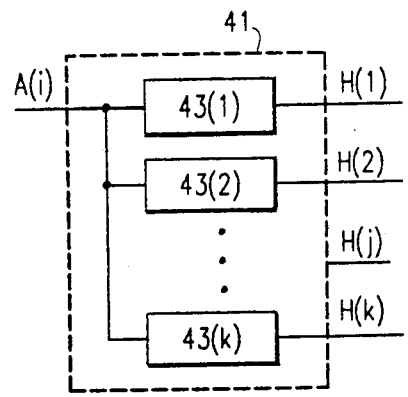
FIG. 5A and 5B show a logic circuit implementation of the histogram generator.
Figure 5B:
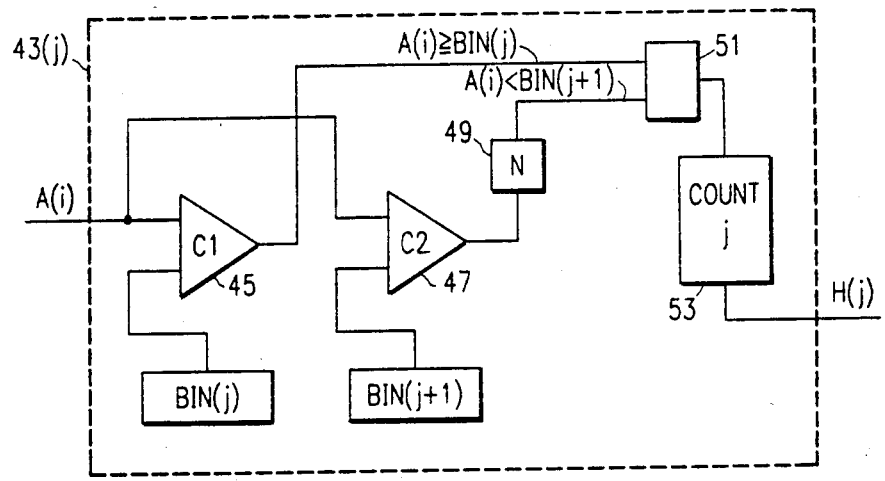

A logic circuit implementation of the histogram generator is shown in FIGS. 5A and 5B. Histogram generator section 17 comprises for each of the 31 channels a generator module 41 which consists of k logic and counting circuits 43, as shown in FIG. 5A. Assuming k=90 amplitude levels, 90 such logic and counting circuits are provided for each of the 31 channels. Consecutive channel values A(i) are presented in parallel to all circuits 43, and for each value one of the histogram count values H(j) will be increase by one unit.

Details of one logic and counting circuit 43 are shown in FIG. 5B. The typical circuit counts the A(i) values that fall between the level border values BIN(j) and BIN(j+1). Comparators 45 (C1) and 47 (C2), the latter followed by inverter 49 determine whether the current value A(i) is greater than BIN(j) or less than BIN(j+1). If this is true, AND gate 51 will furnish a counting pulse to a counter 53 whose output is the level count H(j).

(3) Percentile Extraction

FIG. 6 is a flow diagram of the procedure for extracting the percentile amplitude values P(05) and P(95) from the histograms. This is the operation corresponding to section 19 in FIG. 1. The extraction is done separately for each of the 31 channels.

First, the total count TC is determined by adding up all k level count values H(j). Then, percentile threshold counts L5 and L95 are obtained as 5% and 95% values, respectively, of the total count TC. Thereafter, the lower threshold count L5 is compared to an accumulative count ACC which is initially set to zero and to which is consecutive steps with increasing j (starting with j=1) the histogram count values H(j) are added. When this accumulative count value ACC becomes greater than the threshold count L5, the amplitude level of the fifth percentile is reached, and the respective value BIN(j) is then determined to be the fifth percentile amplitude value P(05). Thereafter, the accumulative count ACC is further increased by consecutive histogram count values H(j) but compared to the upper threshold count L95. When ACC>L95, then the 95th percentile amplitude level is reached and the respective current amplitude value BIN(j) is stored as value P(95).

(4) Normalization Circuitry

In FIGS. 7A and 7B some details of the normalization circuitry are show for executing the operation of section 27 in FIG. 1. As already mentioned, this section receives consecutive amplitude values A(i) for the 31 channels on connections 17, and the percentile amplitude values P(05) and P(95) for all 31 channels on connections 25. The section contains 31 arithmetic modules 55, each for normalizing the amplitude values of one channel. One such arithmetic module 55 is shown in FIG. 7B. It comprises a subtractor 57 for subtracting, from each consecutive value A(in), the stored percentile amplitude value P(05). Another circuit 59 forms the difference P(95)−P(05) and computes the reciprocal value of this difference, then available on line 61. This value could of course be precomputed and stored because the percentile amplitude values are not changed frequently. A multiplier 63 generates the product of the difference from subtractor 57 and the reciprocal value available on line 61, thus furnishing on its output the desired value $$A(\text{out}) = \frac{A(\text{in}) - P(05)}{P(95) - P(05)}$$

for each occuring input value A(i) of this channel.

(D) Modifications (1) Basic Percentile Values

Though the selection of the 5th and the 95th percentile values for normalization of a speech signal are preferred values by which considerable improvement can be achieved, other values can of course be chosen, such as e.g. 3% or 6% for the lower limit, or 97% for the upper limit.

(2) Updating of Percentile Amplitude Values

As was described above, a set of percentile values for all 31 bands is obtained by having one speaker read a sample text and analyzing a one minute interval of it. When such a set is used for normalization, the variations within this single speaker's utterances can be eliminated prior to the recognition process. If, however, the speech of several speakers must be recognized by the same system, a set of percentile amplitude values P(05) and P(95) for each band must be generated for each speaker using a one minute sample utterance of each.

(3) Implementation by Hardware or Software

The different functions for executing present invention, in particular the histogram generation, the percentile amplitude value extraction, and the actual normalization of current values using the predetermined percentile values, can be effected either in hardware or by software. This is a design choice and depends on required speed, possible multiple utilization of functions for other portions of a system, etc. Application of the invention will yield an improved performance anyway.

In addition to the variations and modifications to applicant's disclosed apparatus which have been suggested, many other variations and modifications will be apparent to those skilled in the art, and accordingly, the scope of applicant's invention is not to be construed to be limited to the particular embodiments shown or suggested.

What I claim is:

1. A method for overcoming the distortions in the spectrum-of-silence in a system for accepting words presented in a stream of continuous speech, processing the stream into amplitude histograms for respective frequencies, and carrying out recognition processes, characterized by
   (a) collecting amplitude histograms as a function of frequency;
   (b) extracting, for each frequency, the amplitude P(05) defining the 5th percentile and the amplitude P(95) defining the 95th percentile; and
   (c) normalizing, for each frequency, the input amplitude A(in) of the speech signal to obtain an output signal amplitude $$A(\text{out}) = \frac{A(\text{in}) - P(05)}{P(95) - P(05)}.$$

2. System for normalizing a speech signal for a subsequent analysis or recognition process, characterized by
   means for generating an amplitude histogram for each of several frequency bands, comprising for each of k consecutive amplitude ranges in each frequency band, a histogram count of speech signal amplitudes falling into the respective amplitude range;

means for extracting, for each frequency from its histogram, two percentile amplitude values P(05) and P(95) indicative of the 5th and 95th percentile of the histogram counts, respectively.

means for storing said percentile amplitude values; and means responsive to consecutive amplitude values A(in) of a current speech signal and to the percentile amplitude values available in said storing means, for generating normalized speech signal amplitude values $$A(\text{out}) = \frac{A(\text{in}) - P(05)}{P(95) - P(05)}.$$

for each said frequency band.

3. A method for normalization a speech signal for subsequent speech recognition, the method comprising the steps of:

(a) filtering an input speech signal into a plurality of frequency bands;

(b) sampling the input speech signal at a prescribed sampling rate;

(c) for one sample after another in an analysis interval of the input speech signal, detecting amplitudes values of the input speech signal in each frequency band;

(d) generating, based on the amplitude values detected in step (c), a respective low percentile amplitude value P(lo) and a respective high percentile amplitude value P(hi) for each frequency band and storing the generated percentile amplitude values; and (e) for an amplitude value A(in) of the input speech signal in a given frequency band f, adapting the value A(in) to:

$$A(\text{out}) = \frac{A(\text{in}) - P(\text{lo})_f}{P(\text{hi})_f - P(\text{lo})_f}.$$

4. Method according to claim 3, wherein the percentile generating step includes the steps of:

forming a plurality of histograms each of which indicates the number of detected amplitudes corresponding to a given amplitude range (i) for a given frequency band, and (ii) for a given analysis interval; and determining percentile amplitude values from the formed histograms.

5. Method according to claim 3, characterized in that the high percentile amplitude value for a given subband corresponds to the 95% percentile of all amplitude values of the given subband, and the low percentile amplitude value of the given subband corresponds to the 5% percentile of all amplitude values of the given subband.

6. Method according to claim 4, characterized in that the analysis internal for initially obtaining the high and low percentile amplitude values is one minute.

7. Method according to claim 3, characterized in that the input speech signal is filtered, for the generation of percentile amplitude values and for A(in) value adapting, into more than 30 frequency bands.

8. Method according to claim 7, characterized in that the speech signal is filtered into eight lower frequency bands of equal bandwidth between 200 and 1,000 Hertz, and that the remainder of the spectrum from 1,000 Hertz up to the maximum frequency of the prefiltered speech signal is filtered into bands according to a logarithmic schedule.

9. The method of claim 4 comprising the further step of:

digitizing the input speech signal wherein said sampling and digitizing steps are prior to the filtering step (a).

10. The method of claim 4 wherein the sampling rate is on the order of 1 sample per 0.01 seconds and wherein at least some of the amplitude ranges are on the order of 1 dB.

* * * * *